United States Patent
Sembach et al.

(10) Patent No.: US 6,286,113 B1
(45) Date of Patent: Sep. 4, 2001

(54) METHOD OF MAKING PROTECTED CHANGES TO DATA STORED IN A DATABASE, AS WELL AS DATABASE SYSTEM AND NETWORK ELEMENT EQUIPPED THEREWITH

(75) Inventors: Frank Sembach; Arno Rietzke, both of Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/328,408

(22) Filed: Jun. 9, 1999

(30) Foreign Application Priority Data

Jun. 12, 1998 (DE) .............................................. 198 26 091

(51) Int. Cl.⁷ ...................................................... G06F 12/16
(52) U.S. Cl. ................................................ 714/15; 714/16
(58) Field of Search .......................................... 714/15, 16

(56) References Cited

U.S. PATENT DOCUMENTS

| 5,659,744 | * | 8/1997 | Herbert | 707/205 |
| 5,666,511 | * | 9/1997 | Suganuma et al. | 711/114 |
| 5,696,933 | * | 12/1997 | Itoh et al. | 711/114 |
| 5,787,460 | * | 7/1998 | Yashiro et al. | 711/114 |
| 5,954,822 | * | 9/1999 | Yashiro et al. | 714/6 |

* cited by examiner

*Primary Examiner*—Jack A. Lane
(74) *Attorney, Agent, or Firm*—Sughrue, Mion, Zinn, Macpeak & Seas, PLLC

(57) ABSTRACT

To change data in a database (DB) in such a manner that in case of a disturbance the database can be restored to an initial state, it is proposed to temporarily store the block numbers (BNO) of free memory blocks (BL*) in a nonvolatile semiconductor memory (NVM). In case of a disturbance, the free memory block (BL*) continues to be managed as a free memory block. In case of an undisturbed, successful change to the data, the memory block (BL) in which the old data were stored is deallocated. The invention is particularly suited for use in database systems for network elements of a digital communications network, particularly for crossconnects of an SDH network (SDH=Synchronous Digital Hierarchy).

10 Claims, 3 Drawing Sheets

Fig.3a

| | 1 | 2 | 3 | 4 | 5 | 6 |
|---|---|---|---|---|---|---|
| | X | | | | D | X |

| | 1 | 2 | 3 | 4 | 5 | 6 |
|---|---|---|---|---|---|---|
| | X | D* | D* | X | D | X |

| | 1 | 2 | 3 | 4 | 5 | 6 |
|---|---|---|---|---|---|---|
| | X | D* | D* | X | | X |

| | 1 | 2 | 3 | 4 | 5 | 6 |
|---|---|---|---|---|---|---|
| | X | D* | D* | X | E | X |

| TID | BNO | N |
|---|---|---|
| 54 | | |
| 54 | 2 | 2 |
| 55 | | |
| 65 | 5 | 1 |
| 66 | | |

Fig.3b

| | 1 | 2 | 3 | 4 | 5 | 6 |
|---|---|---|---|---|---|---|
| | X | | | X | D | X |

| | 1 | 2 | 3 | 4 | 5 | 6 |
|---|---|---|---|---|---|---|
| | X | D* | D* | X | D | X |

| | 1 | 2 | 3 | 4 | 5 | 6 |
|---|---|---|---|---|---|---|
| | X | | | X | D | X |

| | 1 | 2 | 3 | 4 | 5 | 6 |
|---|---|---|---|---|---|---|
| | X | E | | X | D | X |

| TID | BNO | N |
|---|---|---|
| 54 | | |
| 54 | 2 | 2 |
| 54 | | |
| 65 | 2 | 1 |
| 66 | | |

METHOD OF MAKING PROTECTED CHANGES TO DATA STORED IN A DATABASE, AS WELL AS DATABASE SYSTEM AND NETWORK ELEMENT EQUIPPED THEREWITH

BACKGROUND OF THE INVENTION

In digital communications networks, particularly in SDH networks (SDH=Synchronous Digital Hierarchy), a database containing data about the current network configuration is provided for each network element. Network elements are also referred to as "nodes".

U.S. Pat. No. 5,524,205 discloses a method of making protected changes to data stored in memory blocks in a database. The database described there is implemented on a hard disk and contains data about the state of a node in a data processing system, which are updated in the form of so-called transactions. A "transaction" corresponds to a group of changes made to change at least one node of the system from one state to the next. The database and two buffers ("undo buffer" and "redo buffer") form a database system which is to ensure that the system can be restarted from a defined state if disturbances should occur during a transaction. To accomplish this, the database system performs a recovery in which prior to the beginning of the transaction, data about the latest state of the node are written into one of the buffers ("undo buffer"), and in which during the transaction, data about the next state of the node are written into the other buffer ("redo buffer"). If the transaction was not disturbed, the data stored in the redo buffer describe the current state of the node. If the transaction was disturbed, the data stored in the undo buffer describe the current state from which the system can be restarted. In the method and system described in U.S. Pat. No. 5,524,205, read/write accesses to two buffers are necessary, which signifies complex and slow memory management.

An article by S. Colombo et al, "Technologie der SDH-Netzelemente: die Software-Plattform", Elektrisches Nachrichtenwesen, a journal published by the applicant, 4th Quarter 1993, pages 321–327, describes the use of object-oriented databases in network elements of an SDH communications network and addresses the subjects of memory management and persistency. A method or apparatus for making protected changes to the stored data is not described. A general description of SDH network elements and their management can be found in the same journal, on pages 329–337, in an article by M. P. Bosse et al, "Management von SDH-Netzelementen: eine Anwendung der Informationsmodellierung".

SUMMARY OF THE INVENTION

It is an object of the invention to provide a method for making protected changes to data stored in a database as well as a database system whereby fast memory management can be provided in a simple manner. In addition, a network element for a digital communications network with such a database system is to be provided.

The object is attained by a method with the features according to claim 1 and by a database system and a network element with the features according to the respective independent claims.

Accordingly, a method is proposed which comprises searching for a free memory block in the database for the new data, temporarily storing the number of this memory block in a nonvolatile semiconductor memory, and checking whether the writing of the new data into the free memory block was disturbed and, if so, continuing to manage the free memory block as such.

In this manner, new data which are to replace old data are written only into free memory blocks, so that no old data are overwritten. Thus, in the event of a disturbance or failure, the old data are completely available for restoring the system. To change the data, the database is controlled by a control unit which accesses the nonvolatile semiconductor memory, where it temporarily stores and manages the block numbers of the memory blocks to be written to, so that in the event of a disturbance or failure, all block numbers specifying the memory blocks involved in the change to the data will be available. Through the use of a semiconductor memory, the management of the database is significantly accelerated.

Further advantages are apparent from the subclaims.

It is particularly advantageously if, in connection with a transaction, only the block numbers of the first memory block of a memory area, the number of memory blocks, and the transaction number are temporarily stored in the nonvolatile semiconductor memory. In this manner, sufficient information for unambiguously identifying the memory blocks affected by the transaction, i.e., for identifying the respective block-number range, is stored. In the event of a disturbance or failure, the transaction can be undone at any time. Only little storage space is needed.

The invention can be used to advantage in a network element which is employed as a crossconnect, an add-drop multiplexer, or a line multiplexer for an SDH communications network.

BRIEF DESCRIPTION OF THE DRAWINGS

The invention will become more apparent from the following description of an embodiment when taken in conjunction with the accompanying drawings, in which:

FIG. 3a shows snapshots of the contents of the memory blocks in the course of an undisturbed change; and FIG. 3b shows snapshots of the contents of the memory blocks in the course of a disturbed change.

DETAILED DESCRIPTION OF THE INVENTION

Figure 1:
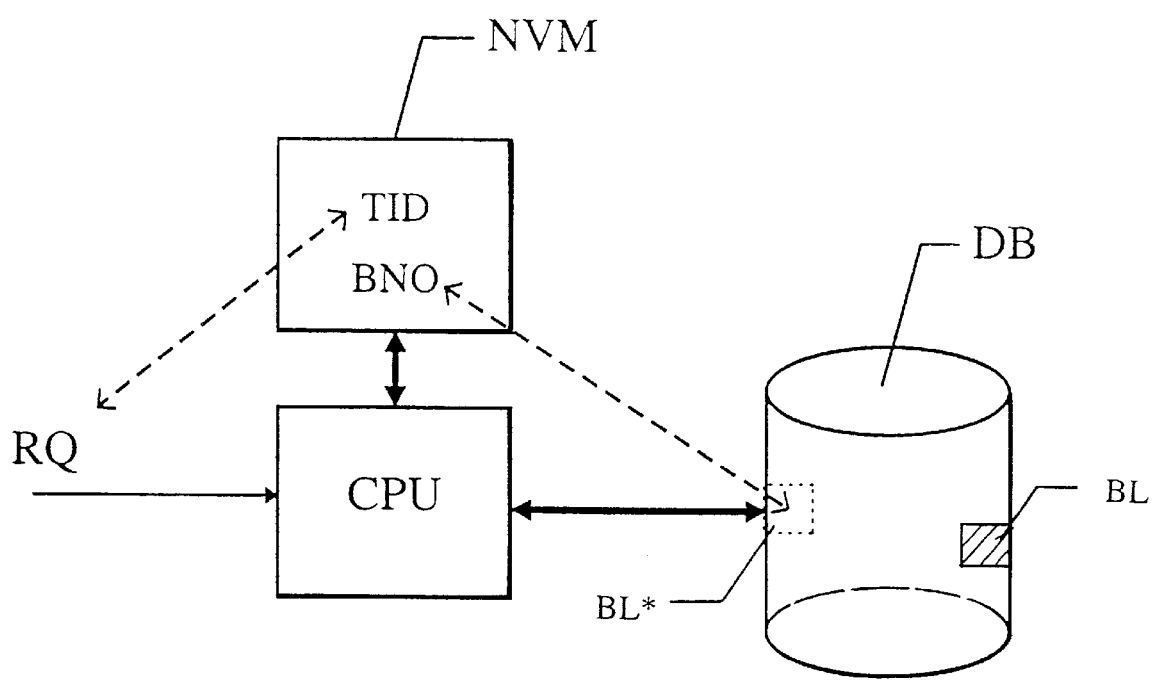
FIG. 1 shows schematically the structure of a database system.

FIG. 1 shows a database system with a database DB, a control unit CPU connected thereto, and a nonvolatile semiconductor memory NVM connected to the control unit. The database system forms part of a network element for an SDH communications network. The database DB is a hard disk whose management is controlled by the control unit CPU. The control unit controls primarily the read/write accesses to the hard disk in order to write data into memory blocks and read data from memory blocks.

Two exemplary memory blocks BL and BL* are shown in FIG. 1. In memory block BL*, no data are stored, i.e., this memory block BL* is a free memory block, in which new data can be stored without having to overwrite old data. The control unit CPU also controls access to the nonvolatile semiconductor memory NVM, which is a battery-buffered random-access memory, for example.

If data stored in the database are to be changed, the control unit will receive a signal RQ which indicates a request for a change. In this example, the request RQ initiates a transaction, to which a given transaction number TID is assigned. The control unit CPU causes the last valid transaction number TID to be stored in the nonvolatile semiconductor memory NVM. By "transaction" as used herein, the complete processing of a group of requests is understood. This means that a transaction is considered successfully completed only if all requests could be processed. In other words: Within a transaction, all requests must be successfully processed (atomic action). The control unit CPU searches for free memory blocks in the database DB. For each transaction, at least two successive memory blocks are needed, of which only one, BL*, is shown by way of example in FIG. 1. The block numbers BNO of these free memory blocks form a block-number range, the first block number of which and the number of memory blocks are temporarily stored in the nonvolatile semiconductor memory NVM. The data can now be changed.

In this example, the old data stored in the memory block BL are to be replaced by new data which are to be written into the free memory blocks BL*. In response to a request RQ, the memory blocks BL* are reserved for the new data. The new data are written into the database under control of the control unit CPU. After the write operation is complete, the old data can be erased or overwritten in a subsequent step. To this end, the memory blocks BL are deallocated.

If the write access to the database is disturbed, for example due to a power failure in the network element, the old state can be restored as follows.

The memory block BL* is managed as if it has not yet been reserved for new data in response to a request RQ. In that case, the old memory block BL is not deallocated. As the block numbers of the memory blocks to be written to, BL*, were temporarily stored in the nonvolatile semiconductor memory, the control unit can determine which memory blocks are affected by the disturbance. If several memory blocks are written to in the course of a transaction, it is advantageous to store only the block numbers of the first and last memory blocks in the nonvolatile semiconductor memory NVM. Via the transaction numbers TID stored in the semiconductor memory, the control unit can determine which transaction was disturbed, and can send a corresponding error message to the other network elements. The method according to the invention, which is carried out by the control unit CPU, will now be described in more detail with the aid of FIG. 2 and with reference to FIG. 1.

Figure 2:
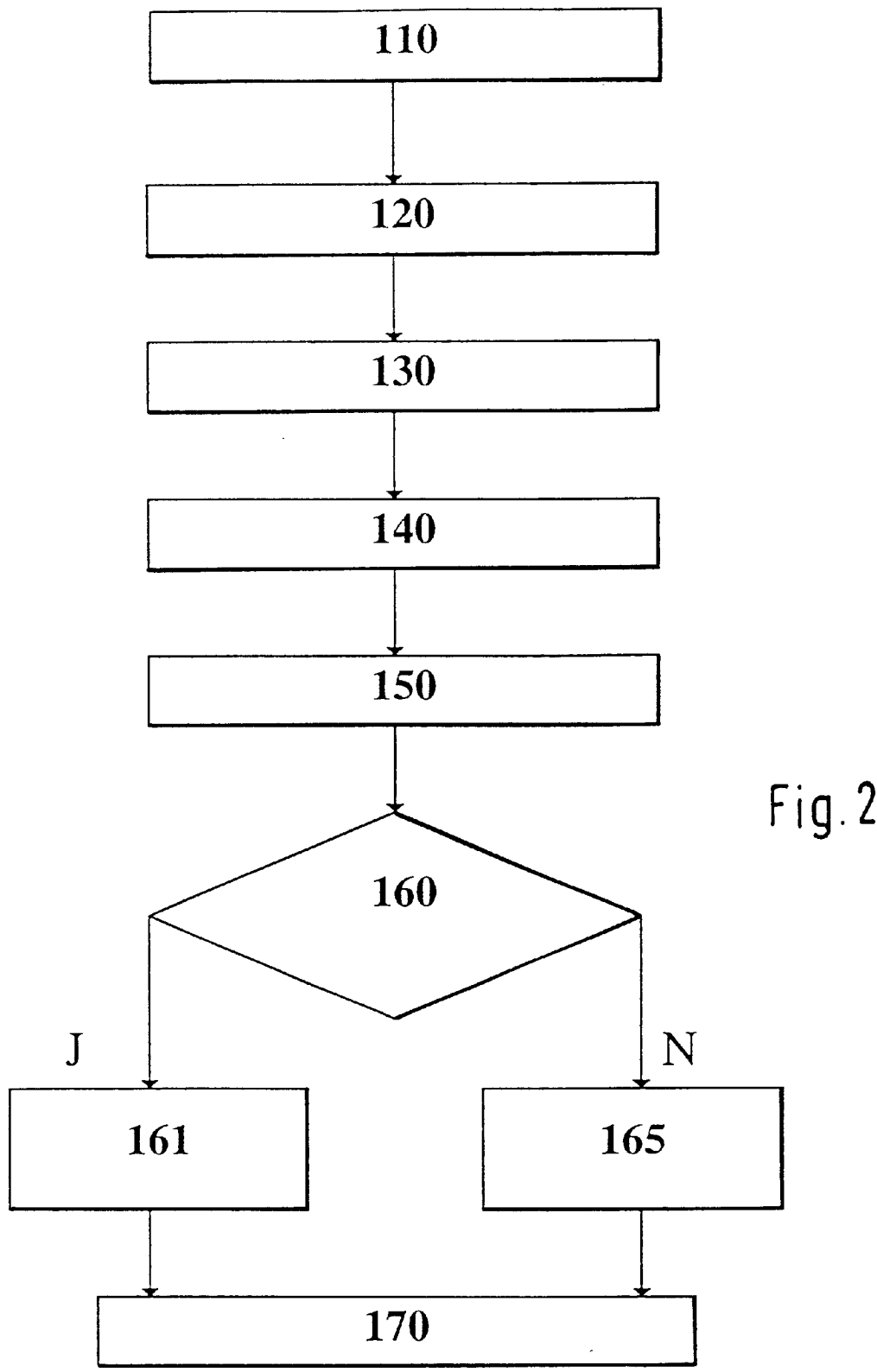
FIG. 2 is a flowchart showing the steps of a method for changing the data.

FIG. 2 is a flowchart showing the steps of a method 100 for making protected changes to data which are stored and managed in the database system described above. In a first step 110, a check is made to determine whether a signal RQ, which corresponds to a request for a change, is being received, i.e., whether a transaction is to be performed. If that is the case, a new transaction number TID will be assigned to this transaction in a step 120. In a subsequent step 130, free memory blocks BL* are searched for in the database DB, which together form a free memory area. In a next step 140, the first block number of this free memory area and the number of memory blocks are written into the nonvolatile semiconductor memory. The nonvolatile semiconductor memory thus serves to store the transaction number and the corresponding information identifying the memory area, such as the first block number and the number of memory blocks. Instead of this information, the first and last block numbers of the memory area (block-number range) can be stored.

Then, in a step 150, the new data which are to replace the old data are written into the free memory blocks. In a step 160, a check is made to determine whether the writing was free from disturbance. This means that the write accesses controlled by the control unit are monitored. If no disturbance occurred, in a step 161, the block number BNO of the free memory block or the corresponding information for the memory area will be erased from the semiconductor memory, the transaction number TID assigned to the transaction in step 120 will be stored as a new, current transaction number in the semiconductor memory, and the memory block in which the old data were stored will be deallocated. If a disturbance was detected in step 160, then, in a step 165, the free memory block into which the new data are to be written will continue to be managed as a free memory block. In a final step 170, any newly occurring requests for changes are delayed until the writing in response to the preceding request RQ could be successfully completed.

FIGS. 3a and 3b show the memory contents in case of an undisturbed change and a disturbed change to the data, respectively. Each of the figures consists of five snapshots relating to the contents of six memory blocks. The memory blocks with the block numbers 1 to 6 will be considered here by way of example, occupied memory blocks being marked with an "X", "D", or "E". Free memory blocks are not marked. Also indicated are the current contents of the semiconductor memory. The change illustrated in FIGS. 3a and 3b concerns the replacement of old data D by new data D*.

In FIG. 3a, the initial state is shown as follows:

Of the six memory blocks with the block numbers 1 to 6, only two are not occupied, namely memory blocks 2 and 3. The other memory blocks are occupied, with memory block 5 containing the old data D. The semiconductor memory contains the current transaction number TID=54. In the course of the above-described method it is determined that memory blocks 2 and 3 are free. Then, the memory area with the block numbers 2 and 3 is reserved for the new data D*. To do this, the first block number BNO=2 and the number of blocks N=2 are written into the semiconductor memory. The transaction is assigned the new transaction number TID=55. If the new data D* could be written into the database undisturbed, the block-number range will be erased from the semiconductor memory, and the current transaction number stored therein will be set to TID=55. The memory block BNO=5, in which the old data D were stored, is freed for a transaction, for example for a subsequent transaction with the transaction number TID=66. During this transaction, the memory block with block number BNO=5 is marked as a memory block to be written to; the number of blocks in this case is N=1.

The method thus ensures that the old data remain completely stored at least until the new data were entered into the database undisturbed.

FIG. 3b shows the memory contents in the event of a disturbance. As in FIG. 3a, the data D contained in memory block 5 are to be replaced by the new data D*. In the course of transaction 55, however, the new data D* could not be written into the free memory blocks 2 and 3. Accordingly, the transaction will be reported as not executed, the block-number range will be erased from the semiconductor memory, the current transaction number will retain its value TID=54, and memory blocks 2 and 3 will continue to be treated as free memory blocks. For example, in a subsequent transaction which increases the current transaction number from TID=65 to TID=66, memory block 2 will be marked as the memory block to be written to and new data E will be written into this block. The old data D will remain in memory block 5 and will not be erased.

FIG. 3b shows that in case of a disturbance, the old data in the database are preserved, and that the database can be restored very quickly to the original state, for example to the initial state corresponding to the snapshot with TID=54.

As was described above, the temporarily stored transaction number TID thus acts as a count that indicates which transaction was last successfully performed. The temporarily stored block numbers indicate which memory blocks are affected by the current transaction. It suffices to store a transaction number, the first block number, and the number of memory blocks. Thus, by temporarily storing only three data, namely 1×TID, 1×BNO, and 1×N, all transactions and all changes to database contents can be carried out reliably and quickly. The buffer needs to comprise only three memory locations.

What is claimed is:

1. A method (100) of making protected changes to data stored in memory blocks in a database (DB), each of the memory blocks having a block number (BNO) assigned thereto, said method (100) comprising the steps of:

searching for a free memory block (BL*) in the database (DB) for new data (D*) which are to replace old data (D) (step 130);

temporarily storing the block number (BNO) of said memory block (BL*) in a nonvolatile semiconductor memory (NVM) (step 140);

writing the new data (D*) into the free memory block (BL*) (step 150);

checking whether the writing of the new data (D*) was disturbed (step 160); and if the writing was not disturbed, erasing the block number (BNO) of the memory block (BL*) containing the new data (D*) from the semiconductor memory (NVM), and deallocating the memory block (BL) containing the old data (D) (step 161), or if the writing was disturbed, continuing to manage the free memory block (BL*) into which the new data (D*) were to be written as a free memory block (BL*) (step 165).

2. A method (100) as claimed in claim 1, comprising the steps of: generating, in response to a request (RQ) for a change, a transaction number (TID) assigned to a transaction comprising changes to data which require a memory area consisting of at least two free memory blocks (step 120); and storing the transaction number (TID) together with information about the memory block in the nonvolatile semiconductor memory (NVM) (step 140).

3. A method as claimed in claim 2 wherein the information about the memory area contains at least the block number of the first and last memory blocks in the memory area.

4. A method (100) as claimed in claim 2 wherein the information about the memory area contains at least the block number (BNO) of the first memory block in the memory area and the number of memory blocks forming the memory area.

5. A method (100) as claimed in claim 2 wherein in response to a subsequent request for a change, the data are changed only if the writing in response to the preceding request (RQ) was not disturbed (step 170).

6. A database system comprising: a database (DB) containing changeable data in memory blocks each having a block number (BNO) assigned thereto; a control unit (CPU) for controlling write and read accesses to the database (DB); and a nonvolatile semiconductor memory (NVM) connected thereto, wherein, in order to make protected changes to the data, the control unit (CPU) searches for a free memory block (BL*) in the database (DB) for new data (D*) intended to replace old data (D), temporarily stores the block number (BNO) of said memory block (BL*) in the nonvolatile semiconductor memory (NVM), writes the new data (D*) into the free memory block (BL*), and checks whether the writing of the new data (D*) was disturbed, and wherein, if the writing was not disturbed, the control unit (CPU) erases the block number (BNO) of the memory block (BL*) containing the new data (D*) from the semiconductor memory (NVM) and deallocates the memory block (BL) containing the old data (D), or wherein, if the writing was disturbed, the control unit (CPU) continues to manage the free memory block (BL*) into which the new data (D*) were to be written as a free memory block (BL*).

7. A database system as claimed in claim 6 wherein the control unit (CPU), in response to a request (RQ) for a change, generates a transaction number (TID) assigned to a transaction comprising changes to data which require a memory area consisting of at least two free memory blocks, and wherein the control unit (CPU) temporarily stores the transaction number (TID), together with information about the memory area, in the nonvolatile semiconductor memory (NVM).

8. A database system as claimed in claim 7 wherein the control unit (CPU), in response to a subsequent request for a change, controls the change to the data only if the writing in response to the preceding request (RQ) for a change was not disturbed.

9. A network element for a digital communications network with a database system comprising: a database (DB) containing changeable data in memory blocks each having a block number (BNO) assigned thereto; a control unit (CPU) for controlling write and read accesses to the database (DB); and a nonvolatile semiconductor memory (NVM) connected to the control unit (CPU), wherein, in order to make protected changes to the data, the control unit (CPU) searches for a free memory block (BL*) in the database (DB) for new data (D*) intended to replace old data (D), temporarily stores the block number (BNO) of said memory block (BL*) in the nonvolatile semiconductor memory (NVM), writes the new data (D*) into the free memory block (BL*), and checks whether the writing of the new data (D*) was disturbed, and wherein, if the writing was not disturbed, the control unit (CPU) erases the block number (BNO) of the memory block (BL*) containing the new data (D*) from the semiconductor memory (NVM) and deallocates the memory block (BL) containing the old data (D), or wherein, if the writing was disturbed, the control unit (CPU) continues to manage the free memory block (BL*) into which the new data (D*) were to be written as a free memory block (BL*).

10. A network element as claimed in claim 9 which is a crossconnect, an add-drop multiplexer, or a line multiplexer for an SDH communications network.

* * * * *